United States Patent [19]

Surber et al.

[11] Patent Number: 5,474,795
[45] Date of Patent: Dec. 12, 1995

[54] DEXTROSE-CONTAINING CHOCOLATE PRODUCTS WITH SUCROSE FATTY ACID POLYESTER FAT SUBSTITUTES

[75] Inventors: Kevin J. Surber, Lombard; Mark S. Miller, Arlington Heights, both of Ill.

[73] Assignee: Kraft Foods, Inc., Northfield, Ill.

[21] Appl. No.: 293,694

[22] Filed: Aug. 19, 1994

[51] Int. Cl.$^6$ ..................................... A23D 7/01
[52] U.S. Cl. ..................... 426/660; 426/611; 426/804
[58] Field of Search ............................ 426/804, 611, 426/660

[56] References Cited

U.S. PATENT DOCUMENTS

| | | | |
|---|---|---|---|
| 4,810,516 | 3/1989 | Kong-Chan | 426/548 |
| 4,822,875 | 4/1989 | McCoy et al. | 536/119 |
| 4,837,041 | 6/1989 | Maruzeni | 426/611 |
| 4,847,105 | 7/1989 | Yokobori | 426/611 |
| 4,888,196 | 12/1989 | Ehrman et al. | 426/601 |
| 5,023,106 | 6/1991 | Ehrman et al. | 426/660 |
| 5,066,510 | 11/1991 | Ehrman et al. | 426/607 |
| 5,071,669 | 12/1991 | Seiden | 426/660 |

FOREIGN PATENT DOCUMENTS

| | | |
|---|---|---|
| 37053/89 | 1/1990 | Australia . |
| 59706/90 | 1/1991 | Australia . |
| 0350981A1 | 1/1990 | European Pat. Off. . |
| 0378876A2 | 7/1990 | European Pat. Off. . |
| 0377237A2 | 9/1990 | European Pat. Off. . |
| 0410507A2 | 1/1991 | European Pat. Off. . |
| 0410506A2 | 1/1991 | European Pat. Off. . |
| 0416665A2 | 3/1991 | European Pat. Off. . |

*Primary Examiner*—Carolyn Paden
*Attorney, Agent, or Firm*—Fitch, Even, Tabin & Flannery

[57] ABSTRACT

Low-fat or reduced-fat chocolate products containing sucrose fatty acid polyesters and dextrose are provided which have texture and mouthfeel properties similar to conventional chocolate products. The sweetener used is dextrose or blends of dextrose and sucrose. These chocolate products are prepared using a sucrose fatty acid polyester or a blend of sucrose fatty acid polyesters in place of the conventional cocoa butter constituent and dextrose or blends of dextrose and sucrose in place of the convention sucrose sweetener. The preferred form of dextrose is dextrose monohydrate. The sucrose fatty acid polyesters used do not necessarily mimic the rheological and thermal properties of cocoa butter. The improved chocolate products have similar texture and mouthfeel properties of conventional chocolate with significantly fewer calories and lower fat content. Moreover, the texture and mouthfeel properties can be varied for various uses by varying the relative proportions of the sucrose fatty acid polyesters and the relative proportions of the dextrose and sucrose in the sweetener. The use of dextrose results in chocolate compositions having improved mouthfeel and significantly reduced levels of waxiness.

34 Claims, No Drawings

5,474,795

DEXTROSE-CONTAINING CHOCOLATE PRODUCTS WITH SUCROSE FATTY ACID POLYESTER FAT SUBSTITUTES

FIELD OF THE INVENTION

The invention generally relates to the field of chocolate products, especially low-fat or reduced-fat chocolate products. More specifically, this invention relates to low-fat or reduced-fat chocolate products having texture and mouthfeel similar to conventional chocolate products. The chocolate products of this invention are prepared using a sucrose fatty acid polyester or a blend of sucrose fatty acid polyesters in place of the conventional cocoa butter constituent. The sweetener used is dextrose (i.e., glucose) or a blend of dextrose and sucrose. The preferred form of dextrose is dextrose monohydrate.

BACKGROUND OF THE INVENTION

Chocolate is a highly desirable confection product which has unique texture and flavor release properties in the mouth. Many of these desirable properties are generally attributable to the fat component of chocolate—cocoa butter—which has a narrow melting point range just slightly below normal body temperature and a sharp melting curve. Accordingly, the desirable flavor release and organoleptic sensations of chocolate occur rapidly as the chocolate melts in the mouth.

Conventional chocolate products generally contain about 30 to 60 percent sugar, about 10 to 70 percent chocolate liquor (which normally contains about 50 percent cocoa butter), about 20 to 25 percent added cocoa butter, and about 1 percent flavor and other constituents. Typically, such chocolate products contain about 30 to 34 percent total fat in the form of cocoa butter. Unfortunately, therefore, conventional chocolate products are generally high in undesirable saturated fats and calories. Due to the relatively recent interest in reducing calorie and saturated fat intake in the diet, there has been an increased interest in providing reduced-calorie and/or reduced-fat chocolate products. Most of these efforts have attempted to provide a substitute for the cocoa butter component in conventional chocolate products.

For example, U.S. Pat. No. 4,810,516 (Mar. 7, 1989) provided a low-calorie, low-fat chocolate product containing an artificial sweetener, a bulking agent, and a cocoa butter substitute. The cocoa butter substitute consisted of a nondigestible fatty polyester or polyether having the approximate melting properties of cocoa butter. Specifically, the cocoa butter substitute was required to have a melting temperature of 30° to 36° C. and a solids content index of at least 66 at a temperature of 6.6° C. below its clear melting point. One example of a suitable cocoa butter substitute was a sucrose esterification product having myristate and laurate fatty acid ester groups in a molar ratio of about 5:3 and a degree of esterification of 7.5 or higher. U.S. Pat. No. 4,822,875 (Apr. 18, 1989) provided a cocoa butter substitute comprising sucrose fatty acid esters having at least four fatty acid ester groups wherein the fatty acid groups consisted of about 25 to 50 percent lauric acid, from about 50 to 75 percent palmitic acid, and up to about 5 percent of other fatty acids. Thus, in order to achieve the required melting properties (i.e., mimicking cocoa butter), these cocoa butter substitutes had to be controlled very carefully as to the types of fatty acids, their ratios, and the overall degree of esterification. As can be seen from these patents, only a few specific sucrose fatty acid esters were suitable for use as cocoa butter substitutes in chocolate products.

European Patent publications 350,981 A1 (published Jan. 1, 1990) provides a hard-fat substitute for chocolate confectionery products. This hard-fat substitute consisted of an indigestible polyol fatty acid polyester wherein the fatty acid resides were derived from certain substantially fully hardened vegetable oils. The fatty acid residues were selected to achieve the desired melting characteristics and preferably were derived from fully hardened palm oil, palm kernel oil, and coconut oil. European Patent Publication 377,237 A2 (published Jul. 11, 1990) relates to confectionery products containing indigestible polyol fatty acid polyesters wherein at least 60 percent of the fatty acid residues consist of lauric and/or stearic acids. It is reported that the use of lauric and stearic acid residues allows for processing advantages without adversely effecting the required melting profiles. European Patent Publication 378,876 A2 (published Jul. 25, 1990) provides a fat substitute consisting of an indigestible polyol fatty acid polyester wherein the fatty acid consisted of at least 30 percent of trans-hardened unsaturated fatty acids, especially trans-hardened oleic acid. The incorporation of the trans-hardened unsaturated fatty acid is said to allow a greater compositional flexibility in regard to suitable fatty acid groups without an adverse effect upon the melting profile. European Patent Publication 410,506 A2 (published Jan. 30, 1991) relates to polyol fatty acid polyesters, defined in terms of their melting profiles, which are suitable for use in chewy confectionery products. European Patent Publication 410,507 A2 (published Jan. 30, 1991) relates to the use of polyol fatty acid polyesters in aerated or whipped products, including chocolate. Once again, suitable polyol fatty acid polyesters are selected and identified in terms of their melting characteristics. European Patent Publication 416,665 A2 (published Mar. 13, 1991) relates to the use polyol fatty acid polyesters, also defined in terms of melting characteristics, for use in soft confectionery products. Thus, it is still apparent from these just-listed publications that suitable polyol fatty acid polyesters suitable for use as cocoa butter substitutes in chocolate products must be carefully selected based on their melting characteristics. The requirement to mimic, or at least approximate, the melting characteristics of cocoa butter significantly impacts the ability to use such polyesters in confectionery products.

U.S. Pat. Nos. 4,888,196 (Dec. 19, 1989), 5,023,106 (Jun. 11, 1991), 5,066,510 (Nov. 19, 1991), and 5,071,669 (Dec. 10, 1991) generally relate to the use of mixtures of certain triglycerides in confectionery products. These triglycerides have certain ratios of medium chain saturated fatty acid residues (generally $C_6$ to $C_{10}$) and long chain saturated fatty acid residues (generally $C_{20}$ to $C_{24}$) in the three ester positions in order to obtain the desired melting and organoleptic properties. U.S. Pat. No. 5,071,669 was directed towards the use of blends of these or similar triglycerides with nondigestible polyol polyesters in various food products, including chocolate products. The polyol polyesters used can be either liquid or solid at body temperature.

It would be desirable, therefore, to provide additional chocolate products and additional cocoa butter substitutes having low or reduced fat content which maintain the texture and flavor characteristics of conventional chocolate products. It would also be desirable to provide chocolate products containing sucrose fatty acid polyesters which are not required to mimic the rheological and thermal properties of cocoa butter. The compositions of this invention generally provide such low-fat or reduced-fat chocolate products having such characteristics.

SUMMARY OF THE INVENTION

The present invention relates to chocolate products, especially low-fat or reduced-fat chocolate products, containing sucrose fatty acid polyesters in place of all or some of the cocoa butter normally used in chocolate products and using either dextrose or a blend of dextrose and sucrose as the sweetener. The chocolate products of the present invention have texture and mouthfeel similar to conventional chocolate products. The sucrose fatty acid polyesters used do not necessarily mimic the rheological and thermal properties of cocoa butter. Rather, the desired texture and mouthfeel properties of the chocolate products of this invention are obtained by blending a cocoa source with one or more sucrose fatty acid polyesters, a sweetener consisting essentially of dextrose or blends of dextrose and sucrose, and lecithin to prepare chocolate formulations containing essentially no cocoa butter or significantly reduced levels of cocoa butter. Two or more sucrose fatty acid polyesters of different firmness and having high levels of sucrose fatty acid octaesters can be employed. The improved chocolate products of the present invention have texture and mouthfeel properties similar to conventional chocolate with significantly fewer calories and lower fat content. Furthermore, the texture and mouthfeel properties can be varied for various uses by varying the relative proportions of the sucrose fatty acid polyesters and the relative proportions of the dextrose and sucrose in the sweetener.

One persistent problem with sucrose fatty acid polyester-based chocolate products is a waxy mouthfeel. Generally, attempts to provide ingredients or combinations of ingredients which significantly reduce the waxy mouthfeel of such chocolate compositions has not been as successful as desired. The incorporation of dextrose, however, either as a total or partial replacement for the sucrose normally used in sucrose fatty acid polyester-containing chocolate compositions, results in improved chocolate products with less waxiness and better, cleaner mouthfeel. For purposes of this invention, "cleaner mouthfeel" means that the chocolate product melts more rapidly with very little residual coating (i.e., waxiness). The dextrose-containing products of this invention have cool, quick melting characteristics in the mouth with the chocolate mass dispersing quickly with little or no waxy residue. The improvement associated with the incorporation of dextrose is surprising. Dextrose, when incorporated into conventional chocolate products (i.e., full fat chocolate), generally gives very poor quality chocolate products. When incorporated into sucrose fatty acid polyester-containing chocolate products, however, the dextrose actually provides a superior product as compared to sucrose. Generally, the chocolate products produced by this invention using dextrose were darker, snapped more easily and cleanly, and were much more easily released from a mold than comparable chocolate products made using only sucrose as the sweetener.

One object of the present invention is to provide a reduced-fat chocolate product comprising a sweetener consisting essentially of dextrose or a blend of dextrose and sucrose, a cocoa source, one or more sucrose fatty acid polyesters, and lecithin, wherein the product has chocolate-like texture and mouthfeel. Optional ingredients which can be used to modify the texture include, for example, hardstock triglycerides and additional emulsifiers such as lactylated glycerides, sorbitan esters, acetylated glycerides, polysorbate esters, and polyglycerol esters.

Another object of the present invention is to provide a reduced-fat chocolate product containing about 25 to 35 weight percent oleaginous components, said product comprising:

(1) about 5 to 20 weight percent of a cocoa source selected from the group consisting of cocoa powder and chocolate liquor;

(2) 0 to about 20 weight percent milk powder;

(3) about 35 to 55 weight percent of a sweetener consisting essentially of 0 to about 75 weight percent sucrose and about 25 to 100 weight percent dextrose;

(4) 0 to about 35 weight percent of a first sucrose fatty acid polyester;

(5) 0 to about 35 weight percent of a second sucrose fatty acid polyester;

(6) about 0.2 to 1.0 weight percent lecithin;

(7) 0 to about 3.0 weight percent of a hydrogenated oil; and (8) 0 to about 1.5 weight percent of an emulsifier selected from the group consisting of lactylated glycerides, sorbitan esters, acetylated glycerides, polysorbate esters, and polyglycerol esters;

wherein the total amount of the first and second sucrose fatty acid polyesters is in the range of about 10 to 35 weight percent and the product has mouthfeel, texture, firmness, and snap similar to conventional chocolate products containing cocoa butter.

These and other objects and advantages will be apparent from a consideration of the present specification.

DETAILED DESCRIPTION OF THE INVENTION

The compositions of the present invention are prepared, as detailed below, from dextrose or blends of dextrose and sucrose, a cocoa source, at least one sucrose fatty acid polyester, and lecithin. Hardstock triglycerides such as hydrogenated oils and additional emulsifiers such as lactylated glycerides, sorbitan esters, acetylated glycerides, polysorbate esters, and polyglycerol esters may be incorporated into the compositions of this invention as texture modifiers. Additionally, milk powder, flavor ingredients, or similar ingredients can also be incorporated in the present compositions.

By varying the relative concentrations of ingredients, the compositions of the present invention can be prepared with textural and mouthfeel properties similar to conventional chocolate products. Moreover, it is not necessary that the sucrose fatty acid polyesters used in this present invention closely mimic the melting characteristics of cocoa butter to achieve such texture and mouthfeel properties.

In one preferred embodiment, the chocolate products of this invention contain about 25 to 35 weight percent oleaginous components. More preferably, these chocolate products contain about 29 to 31.5 weight percent oleaginous components. For purposes of this invention, the oleaginous components include the sucrose fatty acid polyesters, fats, and emulsifiers. Fats are generally found in a number of components, including the cocoa source and hydrogenated oil. Suitable cocoa sources include chocolate liquor and cocoa powder. If desired, additional cocoa butter or milkfat, as a separate component, can be used in the present formulations. If used, however, the level of such cocoa butter or milkfat should be kept relatively low so as not to significantly increase the fat content. If used, the level of such additional cocoa butter is preferably less than about 12 weight percent, and most preferably less than about 2 weight percent. If used, the level of such additional milkfat is preferably less than about 2 weight percent. Generally, the upper limit for total solid fat (as measured at body temperature) derived from the sucrose fatty acid polyester and, if present, the hydrogenated oil is about 10 weight percent of the total oleaginous content. Above this limit, waxiness may become objectionable.

Preferably, the low- or reduced-fat chocolate products of this invention contain (1) about 5 to 20 weight percent of a cocoa source selected from the group consisting of cocoa powder and chocolate liquor; (2) 0 to about 20 weight percent milk powder; (3) about 35 to 55 weight percent of a sweetener consisting essentially of 0 to 75 weight percent sucrose and about 25 to 100 weight percent dextrose; (4) 0 to about 35 weight percent of a first sucrose fatty acid polyester; (5) 0 to about 35 weight percent of a second sucrose fatty acid polyester; (6) about 0.2 to 1.0 weight percent lecithin; (7) 0 to about 3 weight percent of a hydrogenated oil; and (8) 0 to about 1.5 weight percent of an emulsifier selected from the group consisting of lactylated glycerides, sorbitan esters, acetylated glycerides, polysorbate esters, and polyglycerol esters, wherein the total amount of the first and second sucrose fatty acid polyesters is in the range of about 10 to 35 weight percent. The milk powder, hydrogenated oil, and emulsifier are optional ingredients.

More preferably, the compositions of this invention contain (1) about 8 to 18 weight percent of a cocoa source selected from the group consisting of cocoa powder and chocolate liquor; (2) 0 to about 20 weight percent milk powder; (3) about 47 to 52 weight percent of a sweetener consisting essentially of 0 to about 75 weight percent sucrose and about 25 to 100 weight percent dextrose; (4) about 10 to 16 weight percent of a first sucrose fatty acid polyester; (5) about 10 to 16 weight percent of a second sucrose fatty acid polyester; (6) about 0.25 to 0.5 weight percent lecithin; (7) 0 to about 2.5 weight percent of a hydrogenated oil; and (8) 0 to about 1.0 weight percent of an emulsifier selected from the group consisting of lactylated glycerides, sorbitan esters, acetylated glycerides, polysorbate esters, and polyglycerol esters, wherein the total amount of the first and second sucrose fatty acid polyesters is in the range of about 25 to 32 weight percent. The relative proportions of the ingredients of the chocolate products of this invention, especially the sucrose fatty acid polyesters, the optional hydrogenated oil (if present), and sweeteners are adjusted to obtain mouthfeel, texture, firmness, and snap similar to conventional chocolate products containing significant levels of added cocoa butter. For milk chocolate products, the milk powder is preferably in the range of about 7 to 15 weight percent in the above composition.

The compositions of this invention contain about 5 to 20 weight percent of a cocoa source, preferably about 8 to 18 weight percent. The cocoa source is generally cocoa powder or chocolate liquor derived in the conventional manner from cocoa beans. Commercial chocolate liquor normally contains about 50 weight percent cocoa butter. Chocolate liquors having lower levels of cocoa butter can also be used. The preferred cocoa source is cocoa powder since the cocoa butter level can be varied over a considerable range, thus making it possible to produce a chocolate product having even less fat content. Commercial cocoa powders normally contain about 10 to 24 weight percent cocoa butter. Cocoa powders having even less cocoa butter can also be used, including partially defatted cocoa powder containing between about 1 and 10 weight percent cocoa butter and fully defatted cocoa powder containing less than about 1 weight percent cocoa butter.

The compositions of this invention may also contain 0 to about 20 weight percent milk powder. for milk chocolate products, the milk powder preferably is in the range of about 7 to 15 weight percent. Commercially available milk powders can be used in the present compositions. Preferably the milk powder, if used, is a non-fat or reduced-fat milk powder. Of course, milk powder is not needed for dark chocolate products.

Dextrose or blends of dextrose and sucrose are used as sweeteners in the compositions of the present invention at a level of about 35 to 55 weight percent, preferably about 47 to 52 weight percent. Thus, one sweetener suitable for use in the present invention is dextrose without other added natural or artificial sugars or sugar substitutes. Another sweetener is a blend of dextrose and sucrose without any other added natural or artificial sugar or sugar substitute. Preferably the sweetener used in the present invention consists essentially of 0 to about 75 weight percent sucrose and about 25 to 100 weight percent dextrose. When using a blend of dextrose and sucrose, the sweetener more preferably consists essentially of about 30 to 70 weight percent sucrose and about 30 to 70 dextrose, and even more preferably about 45 to 55 weight percent sucrose and about 45 to 55 dextrose. Minor amounts of other sweeteners can also be included in the present compositions so long as they do not materially or significantly effect the role dextrose plays in the present compositions.

The preferred form of dextrose for use in the present invention is dextrose monohydrate. Anhydrous dextrose can be used if sufficient water is added to the composition. When using anhydrous dextrose, the molar amount of added water should not exceed the molar amount of anhydrous dextrose; normally the amount of added water will be in the range of about 0.5 to 1.0 weight percent based on the weight of the formulation. Although not wishing to be limited by theory, it appears that the water associated with the dextrose monohydrate is released during conching. This released water (or added water when anhydrous dextrose is used) may interact with the sugars (dextrose or blends of sucrose and dextrose) to facilitate recrystallization of the sugar. The sugar recrystallization may involve a series of fracture planes formed within the solid sucrose fatty acid polyester matrix which results in an increase in brittleness snap). The sugar crystals may also help disperse the sucrose fatty acid polyester matrix in the mouth, thereby decreasing the oral sensation of waxiness.

When compared to similar sucrose-containing chocolate products, the dextrose-containing products of this invention do exhibit a slight graininess in the mouth apparently cause by a larger particle size (up to about 40 microns) than similar sucrose-containing products (particle sizes up to about 25 microns). The best texture was obtained with a 50/50 blend of dextrose monohydrate and sucrose; this blend resulted in minimal waxiness without substantial graininess. Thus, an especially preferred sweetener consists essentially of about 50 weight percent dextrose monohydrate and about 50 weight percent sucrose. Although not wishing to be limited by theory, the formation of larger particles due to recrystallization during conching may be an important function of the dextrose monohydrate (or of anhydrous dextrose with added water). The preferred post-conching average particle size of the recrystallized sugars is about 30 to 40 microns; average particle sizes much above about 40 microns can, in some cases, result in unacceptable graininess.

The compositions of this invention also contain an least one sucrose fatty acid polyester. The compositions of this invention may contain a blend of at least two sucrose fatty acid polyesters having different firmness and melting profiles. For compositions containing two different sucrose fatty acid polyesters, the first sucrose fatty acid polyesters preferably has a solid fat content (SFC) of about 20 to 50 percent at 20° C. and about 0 to 3 percent at 37° C. (i.e., a "soft" sucrose fatty acid polyester) and the second sucrose fatty acid polyesters preferably has a SFC of about 40 to 70 percent at 20° C. and about 3 to 12 percent at 37° C. (i.e., a "hard" sucrose fatty acid polyester). More preferably, for compositions containing two different sucrose fatty acid polyesters, the first sucrose fatty acid polyesters has a SFC of about 30 to 40 percent at 20° C. and about 0 to 2 percent at 37° C. and the second sucrose fatty acid polyesters has a SFC of about 50 to 60 percent at 20° C. and about 8 to 10 percent at 37° C. Of course, blends of more than two sucrose fatty acid polyesters can be used in the compositions of the present invention. By varying the relative ratios of such sucrose fatty acid polyesters, the physical, flavor release, and organoleptic properties of the chocolate products can be varied over a significant range. Generally the total amount of sucrose fatty acid polyesters present is in the range of about 10 to 35 weight percent, and preferably in the range of about 25 to 32 weight percent. When using two different sucrose fatty acid polyesters, the first sucrose fatty acid polyester is generally in the range of about 0.1 to 35 weight percent, preferably about 10 to 16 weight percent; and the second sucrose fatty acid polyester is generally in the range of about 0.1 to 35 weight percent, preferably about 10 to 16 weight percent.

The sucrose fatty acid polyesters suitable for use in this invention are the sucrose fatty acid polyesters containing at least four fatty acid ester groups. Preferably; the fatty acid groups are long chain saturated or unsaturated aliphatic groups containing between about 8 to 24 carbon atoms. Most preferably, the fatty acid groups are long chain saturated or unsaturated aliphatic groups containing between about 12 to 22 carbon atoms. Especially preferred sucrose fatty acid polyesters are those containing saturated or unsaturated $C_{18}$ fatty acid groups as the predominant fatty acid group. The fatty acid groups in the sucrose fatty acid polyesters are preferably derived from fatty acids selected from the group consisting of butyric, caproic, caprylic, capric, lauric, myristic, myristoleic, palmitic, palmitoleic, stearic, oleic, ricinoleic, linoleic, oleosteric, arachidic, behenic, erucic, arachidonic, and lignoceric acids. Suitable fatty acid groups include those derived from pure fatty acids, naturally-occurring fats and oils (such as, for example, soybean, safflower, corn, canola, peanut, and cottonseed oils), or mixtures thereof. Especially preferred fatty acid groups include stearic, oleic, palmitic, and linoleic acids derived from partially hydrogenated soybean, canola, and cottonseed oils.

Suitable sucrose fatty acid polyesters can be prepared using conventional techniques. Generally, sucrose fatty acid polyesters are prepared by transesterification of sucrose with fatty acid esters or by acylation of sucrose with a fatty acid anhydride, a fatty acid chloride, or a fatty acid. For example, Rizzi et al., U.S. Pat. No. 3,963,699 (issued Jun. 15, 1976), used a solvent-free process for preparing sucrose fatty acid polyesters whereby sucrose and fatty acid esters are heated together in an inert atmosphere at or above the melting point of sucrose (about 185° C.). Akoh and Swanson, 55 *J. Food Sci.*, 236 (1990), prepared sucrose fatty acid polyesters using sucrose octaacetate in a transesterification reaction. Meyer et al., U.S. Pat. No. 4,840,815 (issued Jun. 20, 1989), and Meyer et al., PCT Publication WO 92/0360 (published Mar. 5, 1992), provided a one-stage, solvent-free, low-temperature, low-pressure process for the preparation of sucrose fatty acid polyesters which involved reacting a mixture of a lower acyl ester saccharide, a fatty acid lower alkyl ester, and an alkali metal catalyst at a reaction temperature of 100° to 125° C. while drawing a vacuum of less than about 15 torr over the reaction mixture. More recently, Hasenhuettl, U.S. patent application Ser. Nos. 08/132,106 and 08/132,497 (both filed Oct. 5, 1993) provided improved methods of preparing sucrose fatty acid polyesters via transesterification reactions. All of the just-listed patents, publications, and patent applications relating to the preparation of sucrose fatty acid polyesters are hereby incorporated by reference. Preferably, the sucrose fatty acid polyesters used in this invention are prepared from sucrose octaester by transesterification reactions with fatty acid methyl esters. Preferably, the source of the fatty acids is a mixture of fully and partially hydrogenated soybean oil which is blended in a ratio designed to target compositions in between butter fat and cocoa butter functionality.

The sucrose fatty acid polyesters used in this invention should have at least four fatty acid ester groups, preferably at least six fatty acid ester groups. The most preferred sucrose fatty acid polyesters have essentially eight fatty acid ester groups. Sucrose fatty acid polyesters prepared using the procedures outlined above generally are a mixture of sucrose fatty acid polyesters having varying degrees of esterification (i.e., different number of fatty acid ester groups). It is generally preferred, therefore, that such mixtures be treated so as to remove at least a portion of the sucrose fatty acid polyesters having relatively low numbers of fatty acid ester groups. Moreover, it is generally preferred that such mixtures of sucrose fatty acid polyesters be treated so as to increase the level of sucrose fatty acid polyesters containing eight fatty acid ester groups to at least 70 percent, and more preferably to at least 85 percent. In other words, preferably the sucrose fatty acid polyesters used in the present invention contain at least 70 weight percent sucrose octaesters, and more preferably at least 85 weight percent sucrose fatty acid octaesters. One preferred method of treating the sucrose fatty acid polyesters to increase its octaester content is fractionation using, for example, preparative chromatography with silica gel. Of course, other conventional fractionation techniques can be used to prepare the octaester-enriched fractions.

The use of such octaester-enriched fractions in the compositions of this invention generally results in chocolate products having even cleaner mouthfeel than similar chocolate product prepared with the unfractionated sucrose fatty acid polyesters or with fractions enriched in lower esters. Thus, the chocolate products which contain octaester-enriched fractions generally have more rapid and cleaner flavor release properties. Therefore, the use of such octaester-enriched fractions in the dextrose-containing chocolate compositions of this present invention is especially preferred.

Lecithin is the only emulsifier required in the low- or reduced-fat chocolate compositions of the present invention. Other emulsifiers, however, can be used in combination with lecithin in the low- or reduced-fat chocolate products of this invention. The required emulsifier (lecithin) is normally present in conventional chocolate products. The optional second emulsifier, which is selected from the group consisting of lactylated glycerides, sorbitan esters, acetylated glycerides, polysorbate esters, and polyglycerol esters, may be used to help disperse the sucrose fatty acid polyesters and the hydrogenated oils (if present). This second emulsifier may, in some cases, allow the use of a wider range of sucrose fatty acid polyesters and/or hydrogenated oils (if present) without a significant increase in the overall waxiness of the chocolate product. Preferred second emulsifiers include, for example, sorbitan mono- and tristearates, lactic acid esters of mono- and diglycerides, acetylated monoglycerides, polysorbate esters, and polyglycerol esters. More preferred second emulsifiers include lactic acid esters of mono- and diglycerides and sorbitan mono- and tristearates. Mixtures or blends of the various second emulsifiers can also be used. The required emulsifier (i.e., lecithin) is generally in the range of about 0.2 to 1.0 weight percent, and preferably about 0.25 to 0.5 weight percent. The second emulsifier, if used, is generally in the range of about 0.1 to 1.5 weight percent, and preferably about 0.75 to 1.0 weight percent. Generally, the total amount of the emulsifier (i.e., lecithin and the optional second emulsifier) is in the range of about 0.5 to 2.0 weight percent, and preferably about 0.75 to 1.25 weight percent.

The compositions of this invention may also contain a hydrogenated oil (i.e., a hardstock triglyceride or a stearine) as an optional ingredient. Partially or fully hydrogenated oils can be used; preferably, however, the oil is fully hydrogenated. Generally, the hydrogenated oil is present at a level of 0 to about 3 weight percent. If included in the compositions of this invention, the hydrogenated oil is preferably in the range of about 0.5 to 3 weight percent. Suitable hydrogenated oils include hydrogenated cottonseed oil, hydrogenated rapeseed oil, hydrogenated palm oil, hydrogenated soybean oil, and the like. The hydrogenated oil can, in some cases, be used to adjust and improve the snap and/or firmness of the chocolate product. The desired degree or level of snap and firmness will, of course, depend on the type of chocolate product being prepared. For example, a chocolate candy bar product and chocolate ice cream sauce product should normally have very different degrees of snap and firmness. A chocolate bar is considered to have good snap when it tends to break quickly and cleanly, as opposed to bending under an applied force. Snap and firmness can be measured or estimated using conventional techniques. Hardstock triglycerides, also generally known as stearines, are animal and vegetable oils or fats which have been hydrogenated to a brittle consistency. Generally the iodine value of such an oil or fat is less than about 20, and more preferably in the range of about 2 to 10. The stiffening capacity of such a hardened oil is generally measured by its titer (i.e., melting point). Generally, hydrogenated vegetable oils, such as hydrogenated rapeseed and cottonseed oils, having a titer greater than about 58° C. are preferred.

In addition to the ingredients described above, the present compositions can also contain other ingredients normally used in chocolate products. Such additional ingredients include, for example, flavors, preservatives, colorings, color enhancers, and the like. Generally such additional ingredients are at levels less than about 3.0 weight percent. For example, the compositions may contain up to about 3.0 weight percent of a flavoring such as nut paste, hazelnut paste, caramel powder, peanut paste, vanilla, and the like.

By varying the relative proportions of the components of the chocolate products of this invention, low- or reduced-fat chocolate products having texture and mouthfeel similar to conventional chocolate products can be prepared. The variation of these ingredients— especially the sucrose fatty acid polyesters and sweeteners—allows for control of mouthfeel, texture, firmness, and snap. Variations of these ingredients allows the preparation of low- or reduced-fat chocolate products having mouthfeel, texture, firmness, and snap similar to conventional chocolate products containing cocoa butter. Moreover, it is not necessary for the sucrose fatty acid polyesters to mimic the melting point and thermal properties of cocoa butter.

Not wishing to be limited by theory, the resulting improvement associated with the use of dextrose is thought to be the result of fracture planes formed in the continuous sucrose fatty acid polyester matrix. As noted above, this improvement is surprising because dextrose, when incorporated into conventional chocolate products (i.e., full fat chocolate), generally gives very poor quality chocolate products. The improvement observed with dextrose may be due to the dextrose recrystallizing during conching which could result in a crystal structure which helps break up the continuous sucrose fatty acid polyester phase. Microscopic studies of the dextrose-containing chocolate products of this invention show large, rounded platelike crystals which entirely fill the continuous phase. Similar products prepared only with sucrose generally have smaller, more angular crystals with sharper intersecting sides. The crystalline structure and arrangement in the dextrose-containing products may allow for the development of fracture planes leading to improved snap and dispersion in the mouth.

The chocolate products of the present invention can be prepared by combining the ingredients described above using conventional chocolate-making techniques. For example, the cocoa source, sweetener, a portion of the sucrose fatty acid polyester, and any milk powder, flavor or other optional ingredients are blended together until a uniform consistency is obtained. The blended ingredients are then refined in, for example, a three roller mill, to obtain the desired particle size, which, in many cases, will be less than about 20 microns. The refined mixture is then conched in an appropriate mixer at about 60 to 80° C., preferably about 75° C. After conching for about 0.25 to 1 hour, the remaining ingredients are added (i.e., lecithin and remaining sucrose fatty acid polyester as well as optional ingredients such as the second emulsifier and the hardstock) and the conching continued for an additional 0.5 to 4 hours. The molten product can then be transferred to an appropriate chocolate mold or other container for cooling. Preferably the molten product is first cooled to ambient temperature and then refrigerated. Tempering is generally not required for the chocolate products of this invention.

The following examples are intended to further illustrate the invention and not to limit it. Percentages in the examples and throughout the specification are given in weight percent unless specified otherwise.

EXAMPLE 1

This example illustrates the replacement of sucrose with dextrose as the sweetener. The formulation prepared using only sucrose (sample A) is included for comparison purposes only. The formulations also contained a blend of hard and soft sucrose fatty acid polyesters (SPEs), a hardstock (i.e., palm titer) to improve snap, and two emulsifiers (i.e., lecithin and a lactylated monoglyceride). (In this and the following examples, sucrose fatty acid polyester is often abbreviated as SPE). The basic formulation is given below:

| Ingredient | Sample A | Sample B |
|---|---|---|
| Part I: | | |
| Cocoa (22–24% Fat) | 8.6% | 8.6% |
| Flavor Ingredients | 2.2 | 2.2 |
| Milk Powder | 14.0 | 14.0 |
| Sucrose | 47.0 | 0 |
| Dextrose Monohydrate | 0 | 47.0 |
| Hard SPE | 10.7 | 10.7 |
| Part II: | | |
| Soft SPE | 14.75 | 14.75 |

-continued

| Ingredient | Sample A | Sample B |
|---|---|---|
| Palm Titer | 1.5 | 1.5 |
| Lecithin | 0.25 | 0.25 |
| Second emulsifier | 1.0 | 1.0 |

The second emulsifier was lactylated monoglycerides (Lactodan LW, Grinsted). The solid fat contents (SFC) of the sucrose fatty acid polyester components were determined using NMR:

| | SFC (%) | |
|---|---|---|
| Temp (°C.) | Soft SPE | Hard SPE |
| 10 | 55.3 | 69.5 |
| 21 | 28.1 | 56.9 |
| 27 | 9.8 | 43.3 |
| 33 | 2.8 | 24.1 |
| 37.8 | 2.0 | 8.7 |

The ingredients in Part I were combined and blended in a food processor until a uniform consistency was obtained. The mixture was then refined in a three roller mill to a particle size of less than about 20 microns. Small batches (about 100 to 300 grams) of the refined mixture were then conched at about 75° C. for about 30 minutes using a water-jacketed beaker with an overhead propeller-type mixer. The Part II ingredients were then added to the beaker and conching was continued for an additional hour. The molten product was then transferred to a chocolate mold, cooled to room temperature, and then refrigerated. No other tempering procedure was used.

The properties of Sample B prepared with dextrose were generally superior to those of Sample A prepared with sucrose. Sample B was darker and released very easily from the mold. It has a sharp, clean snap and a cooling mouthfeel. Sample B quickly melted and dispersed in the mouth leaving very little residue. The sample prepared with dextrose was not waxy.

EXAMPLE 2

This example illustrates the use of blends of dextrose and sucrose as the sweetener. The basic formulations were as follows:

| Ingredient | Sample A | Sample B | Sample C |
|---|---|---|---|
| Part I: | | | |
| Cocoa (22–24% Fat) | 8.6% | 8.6% | 8.6% |
| Flavor Ingredients | 2.2 | 2.2 | 2.2 |
| Milk Powder | 14.0 | 14.0 | 14.0 |
| Sucrose | 35.25 | 23.5 | 11.75 |
| Dextrose Monohydrate | 11.75 | 23.5 | 35.25 |
| Hard SPE | 10.7 | 10.7 | 10.7 |
| Part II: | | | |
| Soft SPE | 14.75 | 14.75 | 14.75 |
| Palm Titer | 1.5 | 1.5 | 1.5 |
| Lecithin | 0.25 | 0.25 | 0.25 |
| Second emulsifier | 1.0 | 1.0 | 1.0 |

The various ingredients were the same as used in Example 1.

These samples were processed essentially as described in Example 1. All components of Part II were melting together before being added to the Part I ingredients. Both firmness and snap were evaluated using a TA-XT-2 Texture Analyzer (Texture Technologies Corp.). Firmness was measured using a 60° cone penetrometer at 5 mm/sec for a total depth of 3 mm; snap was measured using a 3-point bend test at 1 mm/sec for a 5 mm total distance. The following results were obtained and compared to a cocoa butter control product and a commercial chocolate bar:

| Sample | Firmness (kg) | Force to Snap (kg) | Distance to Snap (mm) |
|---|---|---|---|
| A | 0.502 | 0.188 | 1.76 |
| B | 0.418 | 0.286 | 1.04 |
| C | 0.612 | 0.322 | 0.52 |
| Control | 2.01 | 0.73 | 0.6 |
| Commercial Bar | 1.48 | 0.89 | 1.23 |

As can be seen, the firmness and force required to snap are lower than the control or commercial chocolate bar. Sample B, having a 50/50 blend of sucrose and dextrose, had the most acceptable snap and mouthfeel. Although Sample C was firmer than Sample B, it had a grainy texture and a sandy mouthfeel. Sample B combined rapid dispersion, absence of waxiness, and minimal graininess.

EXAMPLE 3

This example illustrates the use of different cocoa sources in the compositions of the present invention. By adjusting the amount of cocoa source and milk powder, the total level of triglyceride fat was maintained at about 2.65 grams per 40 gram serving. The basic formulations were as follows:

| Ingredient | Sample A | Sample B | Sample C | Sample D |
|---|---|---|---|---|
| Part I: | | | | |
| Hard SPE | 10.7% | 10.7% | 10.7% | 10.7 |
| Choc. Liquor (54–56% Fat) | 4.5 | 0 | 6.1 | 0 |
| Cocoa (35–37% Fat) | 0 | 10.8 | 0 | 0 |
| Cocoa (22–24% Fat) | 6.3 | 0 | 0 | 17.0 |
| Cocoa (10–12% Fat) | 0 | 0 | 4.7 | 0 |
| Milk Powder | 14.0 | 14.0 | 14.0 | 7.8 |
| Sucrose | 23.5 | 23.5 | 23.5 | 23.5 |
| Dextrose Monohydrate | 23.5 | 23.5 | 23.5 | 23.5 |
| Part II: | | | | |
| Soft SPE | 14.75 | 14.75 | 14.75 | 14.75 |
| Palm Titer | 1.5 | 1.5 | 1.5 | 1.5 |
| Lactylated Monoglyceride | 1.0 | 1.0 | 1.0 | 1.0 |
| Lecithin | 0.25 | 0.25 | 0.25 | 0.25 |

The lactylated monoglyceride was Lactodan LW from Grinsted. The cocoa powders and chocolate liquor were from Bensdorp. Other ingredients were the same as those described in Example 1. Samples were processed essentially as described in Example 1. All components of Part II were melted together before adding to Part I components.

The samples were analyzed using the TA-XT-2 Texture Analyzer for both firmness and snap using the same procedure as Example 2. The following results were obtained:

| Sample | Firmness (kg) | Force to Snap (kg) | Distance to Snap (mm) | Comments |
| --- | --- | --- | --- | --- |
| A | 0.425 | 0.264 | 0.83 | Not waxy, sl. grainy |
| B | 0.472 | 0.288 | 0.74 | Not waxy, sl. grainy |
| C | 0.436 | 0.289 | 0.93 | Not waxy, sl. grainy |
| D | 0.464 | 0.284 | 0.83 | Very Smooth, not waxy or grainy, rich flavor |

Generally the variation of the cocoa source made little difference in the measured physical properties. Sample D, with the most cocoa powder and least milk powder, was however, the smoothest and least grainy product.

EXAMPLE 4

This examples illustrates the preparation of essentially fat-free chocolate formations. The levels of triglyceride fat and monoglyceride emulsifiers were minimized in order to keep total fat below 0.5 grams per 40 gram serving. The basic formulation was as follows:

| Ingredient | Sample A | Sample B |
| --- | --- | --- |
| Part I: | | |
| Hard SPE | 14.7% | 14.7% |
| Cocoa (defatted) | 12.0 | 12.0 |
| Butterfat | 0.63 | 0.63 |
| Milk Powder | 9.42 | 9.42 |
| Sucrose | 23.5 | 23.5 |
| Dextrose Monohydrate | 23.5 | 23.5 |
| Part II: | | |
| Hard SPE | 15.75 | 15.75 |
| Lecithin | 0.5 | 0.5 |

Samples A and B differed only in the source of defatted cocoa powder. Sample A used DeZaan Defatted Type S cocoa powder; Sample B used a Bensdorp Defatted SR cocoa powder. Both cocoa powders contained less than 1 percent cocoa butter. A hardstock triglyceride was not used. In order to increase the firmness, the soft SPE used in Examples 1–3 was also omitted.

Samples were processed as described in Example 1, except that they were conched at 70° C. During the one-hour conching, samples went through several texture changes: from a soft fluid texture similar to cake frosting, to a solid crumbly texture like crumb cake topping, and finally to a fluid melted-chocolate texture.

The samples were analyzed using the TA-XT-2 Texture Analyzer for both firmness and snap as in Example 2. The following results were obtained:

| Sample | Firmness (kg) | Force to Snap (kg) | Distance to Snap (mm) | Comments |
| --- | --- | --- | --- | --- |
| A | 0.829 | 0.208 | 1.57 | Firm, good snap, sl. waxy |
| B | 0.863 | 0.360 | 1.55 | Firm, good snap, sl. waxy |

Both samples were smooth with no apparent graininess. The slight waxiness was probably due to the use of the harder SPE in the composition. The waxiness was, however, much less apparent than for similar formulations made without dextrose.

EXAMPLE 5

This example illustrates the use of different forms of dextrose (i.e., dextrose monohydrate and anhydrous dextrose). Dextrose samples (anhydrous and monohydrate) were from Avebe America, Inc. The basic formulations were as follows:

| Ingredient | Sample A | Sample B |
| --- | --- | --- |
| Part I: | | |
| Soft SPE | 10.7% | 10.7 |
| Cocoa (10–12% fat) | 12.0 | 12.0 |
| Palm Titer | 3.0 | 3.0 |
| Milk Powder | 9.0 | 9.0 |
| Sucrose | 25.0 | 25.0 |
| Dextrose monohydrate | 25.0 | 0 |
| Anhydrous Dextrose | 0 | 25.0 |
| Part II: | | |
| Soft SPE | 14.8 | 14.8 |
| Lecithin | 0.5 | 0.5 |

The hard SPE, used in the earlier examples, was omitted from this formulation. The soft SPE used was as described in Example 1. In order to increase firmness, more hardstock (palm titer) was used. Samples were generally processed as described in Example 1.

The samples were analyzed using the TA-XT-2 Texture Analyzer for both firmness and snap as described in Example 2. Particle size was determined by light microscopy. The maximum particle size was determined using the largest three particles in multiple fields; the average particle size was estimated over all particles. The following results were obtained:

| Sample | Firmness (kg) | Force to Snap (kg) | Distance to Snap (mm) | Particle Size (microns) Maximum | Particle Size (microns) Average |
| --- | --- | --- | --- | --- | --- |
| A | 0.278 | 0.137 | 0.62 | 58 | 30–40 |
| B | 0.455 | 0.157 | 1.31 | 34 | <20 |

Sample A (dextrose monohydrate) was difficult to conch and went through the same phase changes described in Example 4. The mix remained dry for about one hour before becoming homogenous and flowable. After tempering at refrigeration temperatures, Sample A was dark, shiny, and easy to remove from the mold. The mouthfeel was soft and slightly grainy. The product had good snap and rapid flavor release.

Sample B (anhydrous dextrose) processed much more easily than Sample A. It did not undergo the same textural phase during conching as observed with Sample A. Sample B remained flowable throughout conching. The final product was lighter in color and less shiny than Sample A. It was difficult to unmold. The mouthfeel was soft and smooth but waxy and slow to melt. As a result, the flavor release was poor, leaving a waxy residue in the mouth. By adding about 0.5 to 2 weight percent water to Part I of Sample B before conching, the properties of Sample B should increase to the approximate level of Sample A. Without added water, Sample B is not acceptable; with added water, however, Sample B would be acceptable.

That which is claimed is:

1. A reduced-fat chocolate product comprising a cocoa source, one or more sucrose fatty acid polyesters, lecithin and a sweetener which consists essentially of dextrose and sucrose, wherein the product has chocolate-like texture and mouthfeel.

2. A reduced-fat chocolate product as defined in claim 1, wherein the dextrose is dextrose monohydrate.

3. A reduced-fat chocolate product as defined in claim 1, wherein the dextrose is anhydrous dextrose and wherein the product further contains water.

4. A reduced-fat chocolate product as defined in claim 1, wherein the cocoa source is cocoa powder or chocolate liquor.

5. A reduced-fat chocolate product as defined in claim 4, wherein the product further contains milk powder.

6. A reduced-fat chocolate product as defined in claim 5, wherein the milk powder is non-fat milk powder.

7. A reduced-fat chocolate product as defined in claim 1, wherein the cocoa source is cocoa powder.

8. A reduced-fat chocolate product as defined in claim 7, wherein the cocoa source is cocoa powder containing about 10 to 24 weight percent cocoa butter.

9. A reduced-fat chocolate product as defined in claim 7, wherein the cocoa source is cocoa powder containing about 1 to 10 weight percent cocoa butter.

10. A reduced-fat chocolate product as defined in claim 7, wherein the cocoa source is defatted cocoa powder containing less than 1 weight percent cocoa butter.

11. A reduced-fat chocolate product as defined in claim 1, wherein the sucrose fatty acid polyester contains a first and a second sucrose fatty acid polyester fractions of differing hardness and both fractions containing relatively high octaester levels, and where the relative proportions of the first and second sucrose fatty acid polyester fractions are adjusted to balance mouthfeel.

12. A reduced-fat chocolate product as defined in claim 1, wherein the relative proportions of dextrose and sucrose are adjusted to balance mouthfeel and waxiness.

13. A reduced-fat chocolate product as defined in claim 1, wherein the product further contains a hydrogenated oil and an emulsifier selected from the group consisting of sorbitan monostearates, sorbitan tristearates, lactic acid esters of monoglycerides, lactic acid esters of diglycerides, acetylated monoglycerides, polysorbate esters, and polyglycerol esters.

14. A reduced-fat chocolate product as defined in claim 13, wherein the emulsifier is selected from the group consisting of lactic acid esters of monoglycerides, lactic acid esters of diglycerides, sorbitan monostearates, and sorbitan tristearates.

15. A reduced fat chocolate product as recited in claim 1 wherein the sweetener has at least 25 weight percent dextrose, based upon the weight of the sweetener.

16. A reduced fat chocolate product as recited in claim 15 wherein the sweetener has not more than 75 weight percent sucrose.

17. A reduced fat chocolate product as recited in claim 1 wherein the sweetener has not more than 75 weight percent sucrose.

18. A reduced fat chocolate product as recited in claim 1 wherein the sweetener consists essentially of 50 weight percent sucrose and 50 weight percent dextrose.

19. A reduced fat chocolate product containing about 25 to about 35 weight percent oleaginous components, said product comprising:

(1) about 5 to about 20 weight percent of a cocoa source selected from the group consisting of cocoa powder and chocolate liquor;

(2) 0 to about 20 weight percent milk powder;

(3) about 35 to about 55 weight percent of a sweetener consisting essentially of sucrose and dextrose, the sweetener having not more than about 75 weight percent sucrose and about 25 to about 100 weight percent dextrose;

(4) 0 to about 35 weight percent of a first sucrose fatty acid polyester;

(5) 0 to about 35 weight percent of a second sucrose fatty acid polyester;

(6) about 0.2 to about 1.0 weight percent lecithin;

(7) 0 to about 3 weight of a hydrogenated oil; and (8) 0 to about 1.5 weight percent of an emulsifier selected from the group consisting of lactylated glycerides, sorbitan esters, acetylated glycerides, polysorbate esters, and polyglycerol esters;

wherein the total amount of the first and second sucrose fatty acid polyesters is in the range of about 10 to about 35 weight percent and the product has mouthfeel, texture, firmness, and snap similar to conventional chocolate products containing cocoa butter.

20. A reduced-fat chocolate product as defined in claim 19, wherein the sweetener consists essentially of about 40 to 60 weight percent dextrose and about 40 to 60 weight percent sucrose.

21. A reduced-fat chocolate product as defined in claim 19, wherein the sweetener consists essentially of about 50 weight percent dextrose and about 50 weight percent sucrose.

22. A reduced-fat chocolate product as defined in claim 19, wherein the first and second sucrose fatty acid polyesters differ in hardness.

23. A reduced-fat chocolate product as defined in claim 22, wherein at least one of the first and second sucrose fatty acid polyesters is treated so as to contain at least 70 weight percent sucrose fatty acid octaesters.

24. A reduced-fat chocolate product as defined in claim 22, wherein both of the first and second sucrose fatty acid polyesters are treated so as to contain at least 70 weight percent sucrose fatty acid octaesters.

25. A reduced-fat chocolate product as defined in claim 24, wherein the cocoa source is chocolate liquor and the milk powder is non-fat milk powder.

26. A reduced-fat chocolate product as defined in claim 24, wherein the cocoa source is cocoa powder containing about 10 to 24 weight percent cocoa butter and the milk powder is non-fat milk powder.

27. A reduced fat chocolate product as defined in claim 24, wherein the cocoa source is cocoa powder containing about 1 to 10 weight percent cocoa butter and the milk powder is non-fat milk powder.

28. A reduced-fat chocolate product as defined in claim 24, wherein the cocoa source is cocoa powder containing less than about 1 weight percent cocoa butter and the milk powder is non-fat milk powder.

29. A reduced-fat chocolate product as defined in claim 19, wherein the emulsifier is present at about 0.1 to 1.5 weight percent and is selected from the group consisting of sorbitan monostearates, sorbitan tristearates, lactic acid esters of monoglycerides, lactic acid esters of diglycerides, acetylated monoglycerides, polysorbate esters, and polyglycerol esters.

30. A reduced-fat chocolate product as defined in claim 29, wherein the emulsifier is present at about 0.1 to 1.5 weight percent and is selected from the group consisting of lactic acid esters of monoglycerides, lactic acid esters of diglycerides, sorbitan monostearates, and sorbitan tristearates.

31. A reduced-fat chocolate product as defined in claim 19, wherein the milk powder is present at about 7 to 15 weight percent.

32. A reduced-fat chocolate product as defined in claim 19, wherein the hydrogenated oil is present at about 0.5 to 3 weight percent.

33. A reduced-fat chocolate product as defined in claim 19, wherein the dextrose is dextrose monohydrate.

34. A reduced-fat chocolate product as defined in claim 19, wherein the dextrose is anhydrous dextrose and wherein the product further contains water.

* * * * *

UNITED STATES PATENT AND TRADEMARK OFFICE
CERTIFICATE OF CORRECTION

PATENT NO. : 5,474,795
DATED : December 12, 1995
INVENTOR(S) : Kevin J. Surber et al.

It is certified that error appears in the above-indentified patent and that said Letters Patent is hereby corrected as shown below:

Column 16, line 14, change "weight" to -- weight percent--.

Column 16, lines 26-27, change "to 60 weight" to --to about 60 weight--.

Column 16, line 49, change "to 24 weight" to --to about 24 weight--.

Column 16, line 54, change "to 10 weight" to --to about 10 weight--.

Column 16, lines 61-62, change "to 1.5 weight" to --to about 1.5 weight--.

UNITED STATES PATENT AND TRADEMARK OFFICE
CERTIFICATE OF CORRECTION

PATENT NO. : 5,474,795
DATED : December 12, 1995
INVENTOR(S) : Kevin J. Surber et al.

It is certified that error appears in the above-indentified patent and that said Letters Patent is hereby corrected as shown below:

Column 17, lines 2-3, change "to 1.5 weight" to --to about 1.5 weight--.

Column 17, lines 8-9, change "to 15 weight" to --to about 15 weight--.

Column 18, lines 2-3, change "to 3 weight" to --to about 3 weight--.

Signed and Sealed this

Sixth Day of August, 1996

*Attest:*

BRUCE LEHMAN

*Attesting Officer*  Commissioner of Patents and Trademarks